United States Patent
Desbois et al.

(12)
(10) Patent No.: US 6,686,423 B1
(45) Date of Patent: Feb. 3, 2004

(54) METHOD FOR CARRYING OUT THE ANIONIC POLYMERIZATION OF VINYLAROMATIC MONOMERS

(75) Inventors: Philippe Desbois, Maikammer (DE); Volker Warzelhan, Singapore (SG); Christian Schade, Ludwigshafen (DE); Michel Fontanille, Talence (FR); Alain Deffieux, Bordeaux-Cauderan (FR); Stephane Menoret, Bordeaux (FR)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/129,512

(22) PCT Filed: Oct. 31, 2000

(86) PCT No.: PCT/EP00/10772

§ 371 (c)(1), (2), (4) Date: May 6, 2002

(87) PCT Pub. No.: WO01/36494

PCT Pub. Date: May 25, 2001

(30) Foreign Application Priority Data

Nov. 13, 1999  (DE) .......................... 199 54 818

(51) Int. Cl.$^7$ .......................... C08F 4/48; C08F 279/02
(52) U.S. Cl. ............ 526/177; 526/180; 526/181; 526/183; 526/187; 526/189; 526/212; 525/53; 525/249; 525/250; 525/316

(58) Field of Search .................. 526/180, 181, 526/187, 189, 177, 183, 212; 525/53, 249, 250, 316

(56) References Cited

U.S. PATENT DOCUMENTS

| 3,294,774 | A |   | 12/1966 | Gerber |           |
|-----------|---|---|---------|--------|-----------|
| 5,990,236 | A | * | 11/1999 | Knoll et al. | 525/53 |
| 6,429,273 | B1| * | 8/2002  | Ebara  | 526/346   |

FOREIGN PATENT DOCUMENTS

| EP | 98 408   | 1/1984 |
| WO | 97/33923 | 9/1997 |
| WO | 98/07765 | 2/1998 |
| WO | 99/42498 | 8/1999 |
| WO | 99/42499 | 8/1999 |

OTHER PUBLICATIONS

Patent Absts. of Japan Pub.No.11116613—German translation.

* cited by examiner

*Primary Examiner*—Fred Teskin
(74) *Attorney, Agent, or Firm*—Keil & Weinkauf

(57) ABSTRACT

In a process for the anionic polymerization of vinylaromatic monomers or dienes in the presence of a lithium organyl or lithium alcoholate and a magnesium and/or an aluminum compound, a sterically hindered phenol or amine is added.

9 Claims, No Drawings

METHOD FOR CARRYING OUT THE ANIONIC POLYMERIZATION OF VINYLAROMATIC MONOMERS

The present invention relates to a process for the anionic polymerization of vinylaromatic monomers or dienes in the presence of a lithium organyl or lithium alcoholate and a magnesium or an aluminum compound.

The anionic polymerization of styrene copolymers or styrene/butadiene copolymers in the presence of alkyllithiums and retardant additives, such as alkylaluminums or alkylmagnesiums, is disclosed, for example, in WO 98/07765. WO 97/33923 describes polymerization initiators which contain, for example, dialkylmagnesium and alkyllithium or lithium alcoholates. These initiators permit the polymerization of styrene polymers also at relatively high monomer concentrations.

WO 99/42498 describes the advantageous use of the mixtures of alkylaluminums and alkylmagensiums as retardant additives.

Furthermore, polymerization initiators which contain sterically hindered phenolates of aluminum (WO 99/42499) or of alkaline earth metals (JP-A-11-116613) were described for the anionic polymerization of styrene.

Styrene monomers which are not used immediately after the distillation for the polymerization must be mixed with stabilizers for storage and transport. Said stabilizers may influence the polymerization rate of the lithium-initiated polymerization, in particular in the presence of said retardant additives. As a rule, stabilizers must therefore be removed from the styrene before the polymerization.

It is an object of the present invention to provide a process for the controlled anionic polymerization of vinylaromatic monomers or dienes, which process can be used in particular for stabilized monomers.

We have found that this object is achieved by a process for the anionic polymerization of vinylaromatic monomers or dienes in the presence of a lithium organyl or lithium alcoholate and a magnesium or an aluminum compound, wherein a sterically hindered phenol or amine is added.

Examples of suitable sterically hindered phenols are alkylated phenols and phenol derivatives, such as 2,6-di-tert-butyl-4-methylphenol, 2,6-di-tert-butyl-4-nonylphenol, 4,4'-butylidenebis(2-tert-butyl-5-methylphenol), 4,4'-thiobis (2-tert-butyl-5-methylphenol), 2,2'-thiobis(4-methyl-6-tert-butylphenol), 2-methyl-4,6-bis[(octylthio)methyl]phenol, 2,2'-methylenebis(4-methyl-6-tert-butylphenol), 2,2'-methylenebis[4-methyl-6-(1-methylcyclohexyl)phenol], 2,2'-isobutylidenebis(4,6-dimethyl-phenol), 2,4-dimethyl-6-(1-methylcyclohexyl)phenol, 1,1,3-tris(2'-methyl-4'-hydroxy-5'-tert-butylphenyl)butane, styrylated, sterically hindered phenols, 1,3,5-tris[3,5-bis(1,1-dimethylethyl)-4-hydroxybenzyl]-2,4,6-trimethylbenzene, 2,4-dimethyl-6-(1-methylpentadecyl)phenol, 3,3',3",5,5',5"-hexa-tert-butyl-a, a',a"-(mesitylene-2,4,6-triyl)-tri-p-cresol, 6,6'-di-tert-butyl-2,2'-thiodi-p-cresol, alkylated hydroquinones, for example 2,5-di-tert-amylhydroquinone, butylated reaction products of p-cresol and dicyclopentadiene (e.g. CAS Reg. No [68610-51-5]) or α-tocopherol.

Examples of suitable amines are secondary, aromatic amines, such as diphenylamine derivatives, for example diphenylamine alkylated with 2,4,4-trimethylpentene, N,N-dimethylindoaniline or the stabilizers known as HALS compounds (hindered amine light stabilizers).

A particularly preferably used sterically hindered phenol is 2,6-di-tert-butyl-4-methylphenol or 4-tert-butylpyrocatechol.

The sterically hindered phenol and/or amine can alternatively be added to the initiator mixture, to the individual initiator components, to the monomers or to the reaction mixture.

Vinylaromatic monomers and/or dienes which already contain a sterically hindered phenol or amine as a stabilizer can also particularly advantageously be used. As a rule, stabilized monomers contain from 1 to 200, preferably from 5 to 50, ppm of the sterically hindered phenol or amine. In this case, a constant amount of sterically hindered phenol can be achieved in the polymerization solution by separate metering in, even in the case of varying stabilizer contents of monomers used. This also makes it possible to use different raw material qualities.

For example, styrene, α-methylstyrene, p-methylstyrene, ethylstyrene, tert-butylstyrene, vinyltoluene, 1,2-diphenylethylene or 1,1-diphenylethylene or mixtures may be used as vinylaromatic monomers. Styrene is particularly preferably used.

The dienes used may be, for example, butadiene, 1,3-pentadiene, 2,3-dimethylbutadiene, isoprene or mixtures thereof.

Usually, mono-, bi- or polyfunctional alkali metal alkyls, aryls or aralkyls are used as anionic polymerization initiators. Organolithium compounds, such as ethyl-, propyl-, isopropyl-, n-butyl-, sec-butyl-, tert-butyl-, phenyl-, diphenylhexyl-, hexamethylenedi-, butadienyl-, isoprenyl- or polystyryllithium, or the polyfunctional 1,4-dilithiobutane, 1,4-dilithio-2-butene or 1,4-dilithiobenzene are expediently used. The required amount of alkali metal organyl depends on the desired molecular weight, the type and amount of the other metal organyls used and the polymerization temperature. As a rule, it is from 0.002 to 5 mol percent, based on the total amount of monomers.

The polymerization can be carried out in the presence or absence of a solvent. The polymerization is expediently effected in an aliphatic, isocyclic or aromatic hydrocarbon or hydrocarbon mixture, such as benzene, toluene, ethylbenzene, xylene, cumene, hexane, heptane, octane or cyclohexane. Solvents having a boiling point above 95° C. are preferably used. Toluene is particularly preferably used.

Suitable magnesium compounds are those of the formula $R_2Mg$, where the radicals R independently of one another are each hydrogen, halogen, $C_1$–$C_{20}$-alkyl or $C_6$–$C_{20}$-aryl. Dialkylmagnesium compounds, in particular the ethyl, propyl, butyl, hexyl or octyl compounds available as commerical products, are preferably used. The hydrocarbon-soluble (n-butyl)(s-butyl)magnesium or (n-butyl)(n-octyl) magnesium is particularly preferably used.

The aluminum compounds used may be those of the formula $R_3Al$, where the radicals R, independently of one another, are each hydrogen, halogen, $C_1$–$C_{20}$-alkyl or $C_6$–$C_{20}$-aryl. Preferred aluminum organyls are the trialkylaluminums, such as triethylaluminum, triisobutylaluminum, tri-n-butylaluminum, triisopropylaluminum or tri-n-hexylaluminum. Triisobutylaluminum is particularly preferably used. Other suitable aluminum organyls are those which are formed by partial or complete hydrolysis, alcoholysis, aminolysis or oxidation of alkyl- or arylaluminum compounds. Examples are diethylaluminum ethoxide, diisobutylaluminum ethoxide, diisobutyl(2,6-di-tert-butyl-4-methylphenoxy)aluminum (CAS No. 56252-56-3), methylaluminoxane, isobutylated methylaluminoxane, isobutylaluminoxane, tetraisobutyldialuminoxane or bis(diisobutyl)aluminum oxide.

Different magnesium compounds or aluminum compounds may also be used together.

The polymerization of the styrene is particularly preferably carried out in the presence of a trialkylaluminum and/or dialkylmagnesium compound.

The molar ratios of the lithium compounds to the magnesium or aluminum compound can be varied within wide ranges. It depends in particular on the desired molecular weight, the desired polymerization rate and polymerization temperature and the type and amount of monomers. Expediently, the molar ratio of magnesium or aluminum to alkali metal is from 0.2:1 to 5:1. If magnesium and aluminum compounds are used together, the polymerization is carried out at a molar ratio of the sum of magnesium and aluminum to lithium of from 0.2:1 to 5:1.

The amount of sterically hindered phenol or amine added depends on, inter alia, the desired retardant effect. If only monomers stabilized with sterically hindered phenols or amines are used, the polymerization rate is essentially influenced by the magnesium or aluminum compounds. However, the sterically hindered phenol or amine is preferably used in larger amounts. This leads to better control of reactivity and higher thermal stability of the living polymer chains. If the phenol is used in a substoichiometric amount relative to the magnesium compound, the excess magnesium can itself act as a chain initiator. The polymerization is preferably carried out at a molar ratio of magnesium or aluminum (or the sum of magnesium and aluminum if magnesium and aluminum compounds are used) to phenol or amine (or the sum of phenol and amine) of from 1.1 to 100, particularly preferably from 1.5 to 10.

Particularly preferably the novel process can be used for the preparation of high-impact polystyrenes. For this purpose, the vinylaromatic monomer is polymerized in the presence of a copolymer of vinylaromatic monomers and dienes as rubber.

The rubber used is particularly preferably an asymmetrical styrene-butadiene-styrene three-block copolymer $S_1$-B-$S_2$, where $S_1$ is a styrene block having a weight average molecular weight $M_w$ of from 5000 to 100,000 g/mol, preferably from 10,000 to 40,000, g/mol, B is a butadiene block having a weight average molecular weight $M_w$ of from 12,000 to 500,000, preferably from 70,000 to 250,000, g/mol and $S_2$ is a styrene block having a weight average molecular weight $M_w$ of from 30,000 to 300,000, preferably from 50,000 to 200,000, g/mol.

The residual butadiene content of the styrene/butadiene block copolymers used and of the homopolybutadiene should be less than 200 ppm, preferably less than 50 ppm, in particular less than 5 ppm.

The rubber content is expediently from 2 to 25% by weight, based on the high-impact polystyrene.

The conversion, based on styrene of the hard matrix, is as a rule more than 90%, preferably more than 99%. The process can in principal also lead to complete conversion.

The high-impact polystyrene can also be prepared by first preparing a lithium-terminated polydiene and then simultaneously adding vinylaromatic monomers and the magnesium or aluminum compound. This results in the formation of a polydiene/vinylaromatic monomer block copolymer and a hard matrix comprising vinylaroamtic monomers. The block copolymer can also first be polymerized by adding vinylaromatic monomer and then terminated by an H-acidic compound, for example an alcohol. A lithium compound, for example a lithium alcoholate, forms. The polymerization of the hard matrix is then carried out in the presence of the magnesium and/or aluminum compound. In the presence of the lithium compound formed, further initiation with a lithium organyl can be dispensed with.

The growing polymer chains in the novel process have high thermal stability. Consequently, polymerization at high monomer concentrations and high temperatures is permitted. The sterically hindered phenol used is formed again on acidification of the polymer solution and simultaneously serves as a stabilizer for the polymer.

Further conventional assistants such as stabilizers, lubricants, flameproofing agents, antielectrostatic agents, etc., can be added to the novel polymers.

EXAMPLES

Methods of Measurement:

The molecular weights and molecular weight distributions were determined by means of gel permeation chromatography (GPC) in tetrahydrofuran and evaluation of the resulting chromatograms using polystyrene or polybutadiene calibration.

The styrene content and the 1,2-vinyl content of the butadiene fraction of the rubber was determined by evaluating the $^1$H nuclear magnetic resonance spectroscopy data.

For the mechanical and physical measurements of the high-impact polystyrenes compression-molded (DIN 16770—Part 1) test specimens were produced. The yield stress and elongation at break were determined at 23° C. according to DIN-ISO 527. The hole impact strength was determined according to DIN 53753 at 23° C. for compression-molded test specimens having the dimensions 50 mm×6 mm×4 mm (hole diameter: 3 mm).

EXAMPLES

Preparation of Styrene/butadiene Block Copolymers

Example 1

In a stirred kettle having a capacity of 50 l, 95 ml of a 0.24 molar solution of sec-butyllithium in cyclohexane were added to 13.8 kg of dry toluene at 40° C. The solution was mixed with 320 g of styrene while stirring and was heated to 45° C. in the course of 77 minutes. Thereafter, 3570 g of butadiene were added in the course of 50 minutes at an internal temperature of 40° C. and stirring was carried out for a further 8 minutes at 44° C. 2008 g of styrene were then added, the temperature increasing to 53° C. in the meantime. After 74 minutes, 5 g of 2,6-di-tert-butyl-4-methylphenol were added. The solids content was reduced from 30% by weight to 16% by weight by adding 17.2 kg of styrene. The resulting S-B-S block copolymer having the block lengths 15,000/155,000/85,000 g/mol had a molar mass distribution (GPC) with a main molar mass peak Mp at 255,000 g/mol. The residual butadiene content was less than 10 ppm. The 1,2-vinyl content of the polybutadiene block was determined as 12% by means of $^1$H-NMR spectroscopy. The solution viscosity was 39.3 mPas (5.43% strength solution of the block copolymer in toluene).

Example 2

In a stirred kettle having a capacity of 50 l, 95 ml of a 0.24 molar solution of sec-butyllithium in cyclohexane were added to 13.8 kg of dry toluene at 40° C. The solution was mixed with 320 g of styrene while stirring and was heated to 42° C. in the course of 70 minutes. Thereafter, 3570 g of butadiene were added in the course of 50 minutes at an internal temperature of 40° C. and stirring was carried out for a further 28 minutes at 43° C. 2008 g of styrene were then added, the temperature increasing to 45° C. in the meantime. After 90 minutes, termination was effected with 1.8 ml of isopropanol. The solids content was reduced from 30% by weight to 16% by weight by adding 17.2 kg of styrene which had been stabilized with 20 ppm of 2,6-di-tert-butyl-4-methylphenol. The resulting S-B-S block copolymer having the block lengths 15,000/160,000/95,000 g/mol had a molar mass distribution (GPC) with a main molar mass peak Mp at 270,000 g/mol. The residual butadiene content was less than 10 ppm. The 1,2-vinyl content of the polybutadiene block was determined as 11% by means of $^1$H-NMR spectroscopy. The solution viscosity was 67.3 mPas (5.43% strength solution of the block copolymer in toluene).

Preparation of High-impact Polystyrene

Example 3

A double-wall 1.9 l stirred kettle having a standard anchor stirrer was used for the continuous polymerization. The reactor was designed for a pressure of 25 bar and was heated by a heat transfer medium for an isothermal polymerization. 380 g/h of styrene, 657 g/h of the block copolymer solution from Example 1 and a solution of 11.9 g/h of a 0.8 molar solution of (n-butyl)(s-butyl)magnesium in heptane, which had been diluted in the weight ratio 1:4 with toluene, were metered continuously into the stirred kettle while stirring (100 revolutions per minute) and stirred at a constant material temperature of 99.5° C.

The solution was transferred to a stirred 4 liter tower reactor which had been provided with two heating zones of equal size. The first zone was regulated at an internal temperature of 127° C. and the second one at 162° C. The discharge from the reactor was mixed with 11 g/h of a 10% strength by weight solution of methanol in toluene and, via a mixer, with mineral oil (2.5%). Thereafter, the melt was fed via a pipe section heated to 240° C. and let down via a pressure control valve into a vacuum vessel operated at 10 mbar. The melt was discharged by means of a screw and was granulated.

After a short time, a constant operating state was established. The solids content at the outlet of the first kettle was 30% by weight. A quantitative conversion was found at the discharge of the continuous unit. The polystyrene matrix had a molecular weight Mw=172,000 g/mol and a nonuniformity Mw/Mn of 3.80; the distribution was monomodal.

A content of less than 5 ppm of styrene and less than 5 ppm of ethylbenzene was determined.

Example 4

The procedure was as in Example 3, except that 369 g/h of unstabilized styrene, 669 g/h of the block copolymer solution from Example 2 and a solution of 13.1 g/h of a 0.8 molar solution of (n-butyl)(s-butyl)magnesium in heptane, which had been diluted in the weight ratio 1:4 with toluene, were metered continuously and stirred at a constant material temperature of 92° C. The first zone of the 4 liter tower reactor was regulated to an internal temperature of 126° C. and the second to 160° C. The solids content at the outlet of the first kettle was 37% by weight, and a quantitative conversion was found at the discharge of the continuous unit. The polystyrene matrix had a molecular weight Mw=178,000 g/mol and a nonuniformity Mw/Mn of 2.97; the distribution was monomodal. A content of less than 5 ppm of styrene and less than 5 ppm of ethylbenzene was determined.

Example 5

Example 4 was repeated, except that a styrene stabilized with 20 ppm of 2,6-di-tert-butyl-4-methylphenol was used.

The solids content at the outlet of the first kettle was 32.5% by weight. A quantitative conversion was found at the discharge of the continuous unit. The polystyrene matrix had a molecular weight Mw=178,500 g/mol and a nonuniformity Mw/Mn of 3.08; the distribution was monomodal.

A content of less than 5 ppm of styrene and less than 5 ppm of ethylbenzene was determined.

TABLE 1

Properties of the high-impact polystyrenes from Examples 3 to 5:

| Example | 3 | 4 | 5 |
|---|---|---|---|
| Block copolymer from Example | 1 | 2 | 2 |
| Stabilizer content of the styrene (2,6-di-tert-butyl-4-methylphenol) | 0 | 10 ppm | 20 ppm |
| Yield stress [N/mm$^2$] | 19.8 | 26.2 | 24.7 |
| Elongation at break [%] | 18.4 | 26.0 | 32.0 |
| Hole impact strength [kJ/m$^2$] | 8.2 | 15.0 | 13.8 |
| Melt volume rate MVR [cm$^3$/10 ml] | 4.9 | 5.2 | 4.9 |
| Heat distortion [° C.] resistance Vicat B/50 | 92.5 | — | 92.2 |

Preparation of a 0.1 M Magnesium Phenolate Solution I1:

0.637 g of 2,6-di-tert-butyl-4-methylphenol (from Aldrich) and 2.9 ml of a 1.0 molar solution of dibutylmagnesium (DBM) in heptane (from Aldrich) were combined at 25° C. and stirred for 10 hours in 26 ml of cyclohexane before use.

Example 6

1.40 ml of a sec-butyllithium solution (1.3 M in cyclohexane) and 1.7 ml of styrene were added to 200 ml of cyclohexane and stirred for 4 hours. 30 ml of this solution were transferred to a 100 ml flask with a sealed-on UV cell. The concentration of the polystyryllithium [PS-Li] was determined as $1.25 \cdot 10^{-2}$ M by UV spectroscopy. A mixture of 3.0 ml of a 0.1 M solution I1 and 3.0 ml of a 0.1 M solution of (n-butyl)(sec-butyl)magnesium (DBM) in cyclohexane was added to this solution (molar Mg/Li ratio=1.6). The solution was mixed with 3.05 ml of styrene while stirring and was heated to 100° C. The decrease in the styrene concentration was monitored at 100° C. by UV spectroscopy and evaluated according to a first order rate equation:

The slope of the straight line obtained was $k_a$=0.008 min$^{-1}$. From this and from the concentration of polystyryllithium [PS-Li], a reaction rate constant $k_{app}=k_a/[PS\text{-}Li]^{0.5}=0.08$ M$^{0.5}$ min$^{-1}$ was determined.

After 24 hours the reaction was stopped with 1 ml of methanol. The conversion was 100% by weight. The polystyrene obtained had a molar mass Mn of 4500 g/mol and a molar mass distribution Mw/Mn of 1.25. The residual styrene content was less than 10 ppm.

Example 7

Example 6 was repeated using an Mg/Li ratio of 4.8. For this purpose, the polystyryllithium solution was mixed with a mixture of 9.0 ml of a 0.1 M solution I1 and 9.0 ml of a 0.1 M solution of DBM in cyclohexane. The solution was mixed with 2.35 ml of styrene while stirring and was heated to 100° C. The decrease in the styrene concentration was monitored at 100° C. by UV spectroscopy and evaluated according to a first order rate equation:

The slope of the straight line obtained was $k_a$=0.0028 min$^{-1}$. From this and from the concentration of polystyryllithium [PS-Li], a reaction rate constant $k_{app}=k_a/[\text{PS-Li}]^{0.5}=0.03$ $M^{-0.5}$ $\min^{-1}$ was determined.

After 24 hours, the reaction was stopped with 1 ml of methanol. The conversion was 100% by weight. The polystyrene obtained had a molar mass Mn of 2100 g/mol and a molar mass distribution Mw/Mn of 1.25.

The residual styrene content was less than 10 ppm.

Example 8

Example 6 was repeated using a magnesium/phenolate ratio of 3/1. For this purpose, the polystyryllithium solution was mixed with a mixture of 3.25 ml of a 0.1 M solution I1 and 6.5 ml of a 0.1 M solution of DBM in cyclohexane (molar Mg/Li ratio=3.0). The solution was mixed with 3.25 ml of styrene while stirring and was heated to 100° C. The decrease in the styrene concentration was monitored at 100° C. by UV spectroscopy and evaluated according to a first order rate equation:

The slope of the straight line obtained was $k_a=0.004$ $\min^{-1}$. From this and from the concentration of polystyryllithium [PS-Li], a reaction rate constant $k_{app}=k_a/[\text{PS-Li}]^{0.5}=0.043$ $M^{-0.5}$ $\min^{-1}$ was determined.

After 24 hours, the reaction was stopped with 1 ml of methanol. The conversion was 100% by weight. The polystyrene obtained had a molar mass Mn of 3300 g/mol and a molecular weight distribution Mw/Mn of 1.20.

The residual styrene content was less than 10 ppm.

The half-life of the living polymer chains at 150° C. in decalin was determined as 63 minutes.

Example 9

Example 8 was repeated using a magnesium/phenolate ratio of 3/2. For this purpose, a mixture of 6 ml of a 0.1 M magnesium phenolate solution I1 and 3.25 ml of a 0.1 M solution of DBM in cyclohexane was added to the polystyryllithium solution (molar Mg/Li ratio=3.0). The half-life of the living chains at 150° C. in decalin was determined as 110 minutes.

We claim:

1. A process for the anionic polymerization of vinylaromatic monomers or dienes in the presence of a lithium organyl or lithium alcoholate and a magnesium and an aluminum compound, wherein a sterically hindered phenol or sterically hindered aromatic amine is added.

2. The process of claim 1 wherein the molar ratio of the sum of the magnesium and aluminum to lithium is from 0.2 to 5.

3. A process for the anionic polymerization of vinylaromatic monomers in the presence of a styrene/butadiene copolymer in the presence of a lithium organyl or lithium alcoholate and a magnesium and/or an aluminum compound, wherein a sterically hindered phenol or sterically hindered aromatic amine is added.

4. A process as claimed in claim 3 wherein the polymerization of the vinylaromatic monomers is carried out continuously in a reactor cascade comprising at least one back-mixing reactor and at least one downstream reactor having a plug flow characteristic.

5. The process of claim 3 wherein the styrene/butadiene copolymer is a three-block copolymer $S_1$-B-$S_2$, wherein $S_1$ is a styrene block having a weight average molecular weight $M_w$ of 5,000 to 100,000 g/mol, B is a butadiene block having an average molecular weight $M_w$ of 12,000 to 500,000 g/mol and $S_2$ is a styrene block having a weight average molecular weight of from 30,000 to 300,000 g/mol.

6. A process for the anionic polymerization of vinylaromatic monomers or dienes in the presence of a lithium organyl or lithium alcoholate and a magnesium and/or an aluminum compound, wherein a sterically hindered aromatic amine is added.

7. A process for the anionic polymerization of vinylaromatic monomers or dienes in the presence of a lithium organyl or lithium alcoholate and a magnesium and/or an aluminum compound, wherein a sterically hindered phenol or sterically hindered aromatic amine is added and wherein the molar ratio of magnesium and/or aluminum to lithium is from 0.2 to about 3.

8. The process of claim 7 wherein the ratio is 0.2 to 3.

9. A process for the anionic polymerization of vinylaromatic monomers or dienes in the presence of a lithium organyl or lithium alcoholate and a magnesium and/or an aluminum compound, wherein a sterically hindered phenol or sterically hindered aromatic amine is added and wherein the magnesium compounds are $R_2Mg$ wherein the R radicals independently of one another are hydrogen, halogen, $C_1$–$C_{20}$-alkyl or $C_6$–$C_{20}$-aryl, and wherein the molar ratio of magnesium and/or aluminum to lithium is from 0.2 to about 3.

* * * * *